July 29, 1941.                T. L. SHERMAN                2,250,608
            POWER TAKE-OFF OR DRIVING MECHANISM
                    Filed Aug. 8, 1939            2 Sheets-Sheet 1
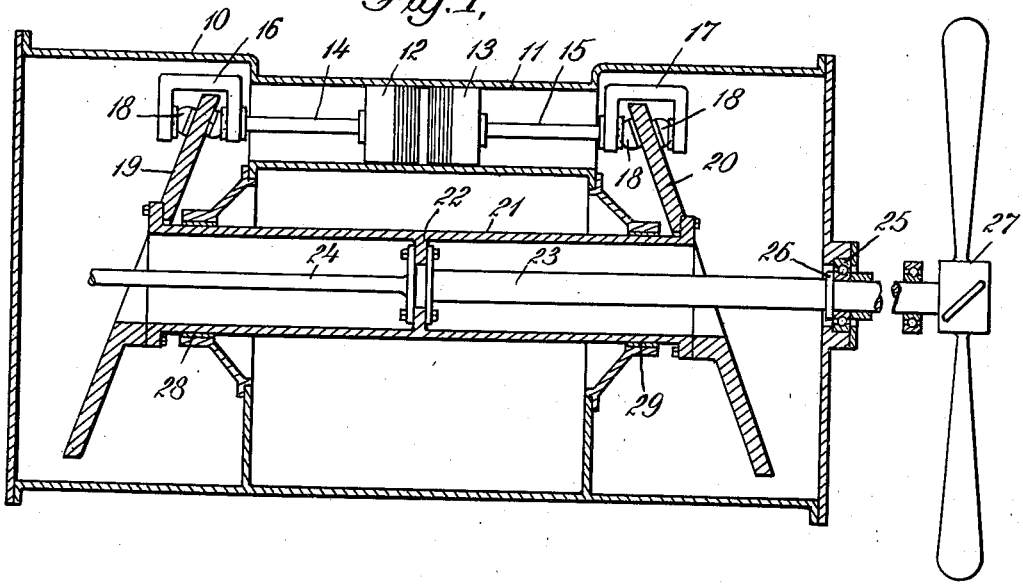
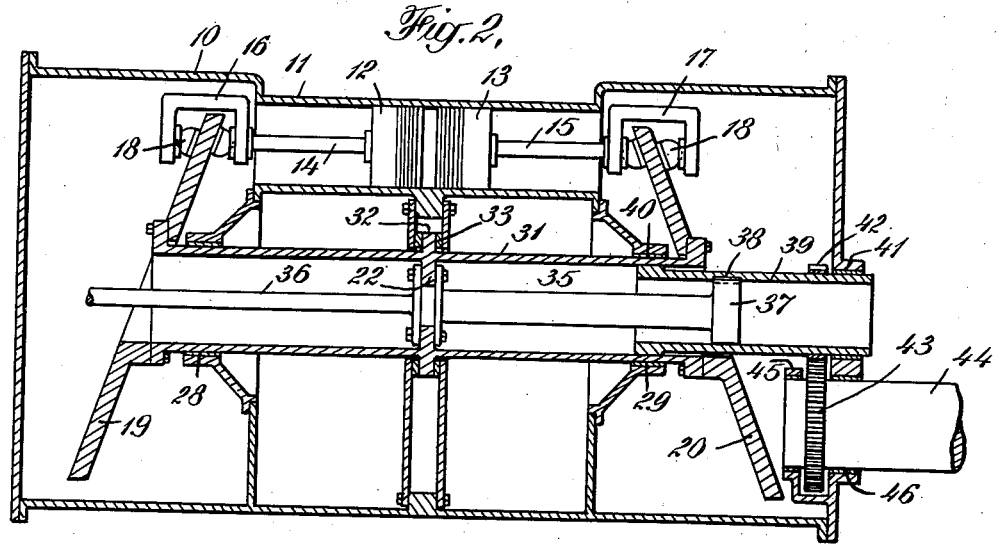
INVENTOR
Thomas L. Sherman
BY
Marshall Hawley,
ATTORNEY July 29, 1941.  T. L. SHERMAN  2,250,608
POWER TAKE-OFF OR DRIVING MECHANISM
Filed Aug. 8, 1939  2 Sheets-Sheet 2
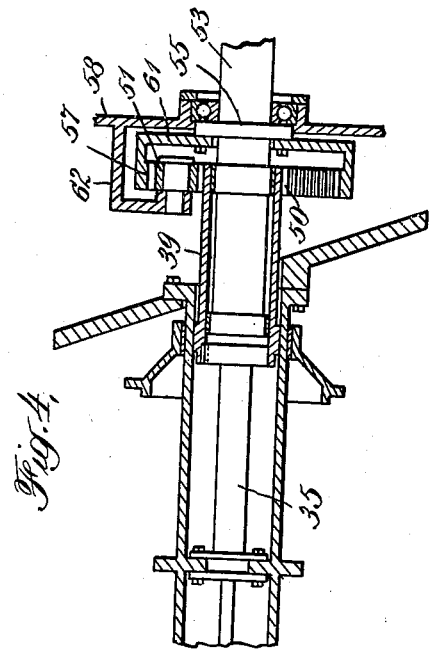
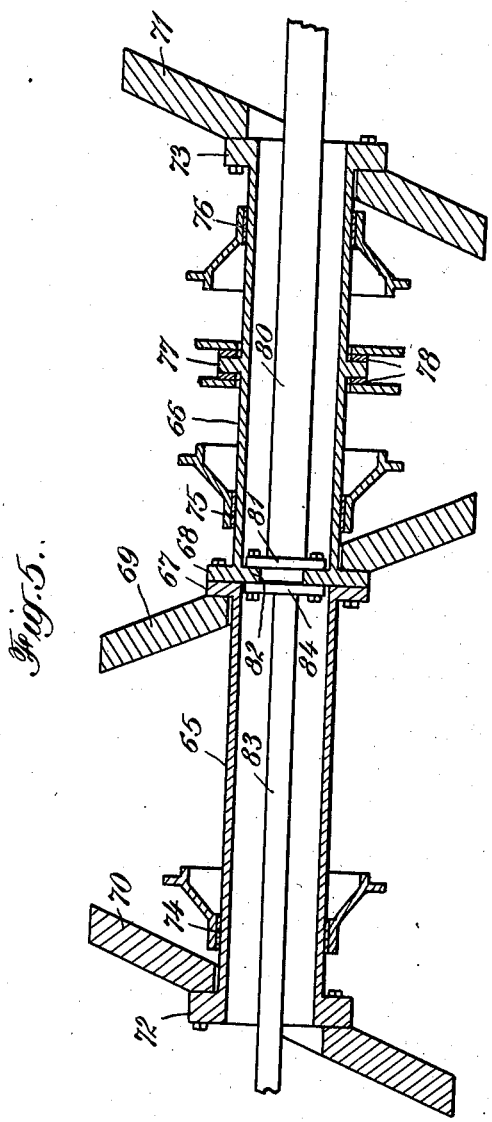
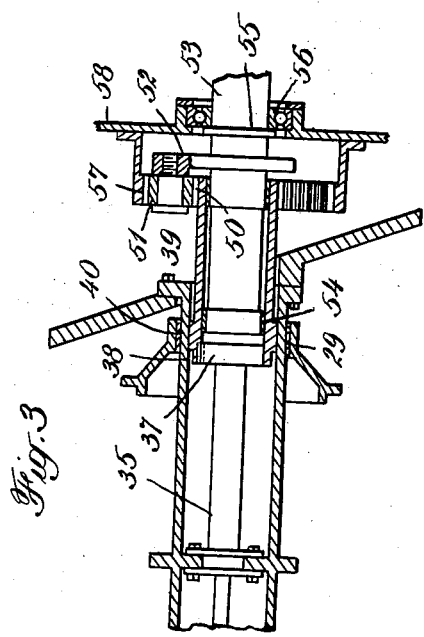
INVENTOR
Thomas L. Sherman
BY
Marshall & Hawley.
ATTORNEY Patented July 29, 1941

2,250,608

UNITED STATES PATENT OFFICE 2,250,608

POWER TAKE-OFF OR DRIVING MECHANISM

Thomas L. Sherman, New York, N. Y., assignor to Michell-Crankless Engines Corporation, New York, N. Y., a corporation of New York Application August 8, 1939, Serial No. 288,929

10 Claims. (Cl. 74—60)

This invention relates to power take-off or driving mechanism.

More particularly stated, the invention relates to a drive take-off from a shaft driven by crankless or swashplate type of mechanism in which the power is generated or obtained from opposed pistons utilizing two or more swashplates or slants.

In mechanisms having shafts on which are mounted masses having rotational inertia or flywheel characteristics, torsional vibrations may be set up in the shafts. When the frequency of the torque impulses coincides with the natural periodicity of the shaft system, excessive amplitudes of vibration may occur and be destructive in their action.

In crankless mechanism the slants or inclined masses attached to the shaft, which transmit the reciprocating piston movement to the rotating shaft and transform the reciprocating motion into rotary motion, cause torsional vibrations or vibratory disturbances to be set up, and the salient object of this invention is to provide a drive take-off from a slant driven shaft so arranged that the shaft at the point of take-off or power transmission to the driven shaft will be substantially free from vibration.

Further objects of the invention will appear from the following specification taken in connection with the drawings which form a part of this application, and in which Fig. 1 is a longitudinal sectional elevation somewhat diagrammatic, illustrating drive takeoffs constructed in accordance with the invention;

Fig. 2 is a view similar to Fig. 1 showing a modified form of drive take-off;

Fig. 3 is a fragmentary view showing in longitudinal section a portion of the power shaft and of the driven shaft and one form of drive transmission from the driven shaft;

Fig. 4 is a view similar to Fig. 3 but showing a slightly modified form of transmission gearing; and Fig. 5 is a longitudinal sectional elevation of a slant driven shaft having mounted thereon three slants and illustrating a power take-off constructed in accordance with the invention.

In the form of the invention illustrated in Fig. 1 there is shown a casing 10 having mounted therein a plurality of cylinders 11, one of which is illustrated. Each cylinder has mounted therein a pair of pistons 12 and 13 to which are secured piston rods 14 and 15 on the outer ends of which are mounted yokes 16 and 17. Each yoke has mounted therein a pair of slipper pads 18, 18 which engage opposite surfaces of slants 19 and 20 which are secured to a hollow drive shaft 21.

As the opposed pistons 12 and 13 moved outwardly on their power stroke the reciprocating motion thereof is transmitted through the slants 19 and 20 to the hollow drive shaft 21 in a well known manner. The shaft 21 is designed to have sufficient strength to withstand lateral bending moments imposed thereon by the pistons and slants and, furthermore, to have sufficient torsional stiffness to suit the required conditions of operation of the engine.

When the slants 19 and 20 and their coacting reciprocating masses are of substantially the same size and shape they will have similar rotational mass effects and therefore the nodal point in the shaft having substantially no vibratory distortion will be disposed midway between the slant planes. If the slant masses are unequal the nodal point will be displaced from this central position.

In order to take advantage of this absence of torsional disturbance at the nodal point, the shaft 21 has formed thereat an internally extending flange 22 and the power take-off shaft 23 is bolted to the flange 22. Similarly, an auxiliary take-off shaft 24 for driving engine accessories, such as a supercharger, is also bolted to the flange 22. The shafts 23 and 24, as illustrated in Fig. 1, are provided with flanges or heads at their inner ends which are bolted to the flange 22.

The shaft 23 extends outwardly through a thrust or locating bearing 25, the shaft being provided with a flange or collar 26 engaging the bearing.

Power may be taken from the shaft 23 in any desired manner and, as shown in Fig. 1, a propeller 27 is mounted on the outer end of the shaft 23. The shaft 21 is illustrated in Fig. 1 as mounted in bearings 28 and 29.

Since the power take-off or the connection between the driven shaft 23 and the power shaft 21 is disposed at the nodal point of the shaft 21, the power will be taken from the shaft 21 at the point at which there is no disturbance arising from torsional vibration.

In Fig. 2 the cylinders, slants and drive shaft are constructed and arranged in the same manner as that illustrated in Fig. 1 and the same reference characters are used to indicate the casing 10, cylinder 11, pistons 12 and 13, connecting rods 14 and 15, yokes 16 and 17 and slants 19 and 20. The slants are mounted on the drive shaft 31 which has an outwardly extending peripheral flange 32 which is mounted in a thrust or locating bearing 33.

The main power take-off shaft 35 is connected to the inwardly extending flange 22 in the same manner as in Fig. 1 and this statement also applies to the auxiliary take-off shaft 36.

The shaft 31 is mounted in bearings 28 and 29 having the same construction as those illustrated in Fig. 1.

In the form of the invention illustrated in Fig. 2 the outer end of the power take-off or driven shaft 35 has formed thereon a head 37, with a spline drive at 38 to a hollow shaft 39 which is supported at its inner end, as shown at 40, in the shaft 31 and has its outer end supported in a bearing 41.

The shaft 39 has mounted thereon a gear 42 which meshes with and drives a gear 43 on a shaft 44 supported in bearings 45 and 46. Since the shaft 39 has its inner end 40 supported substantially in the plane of the bearing 29, the shaft 39 will be free from any lateral deflection of the shaft 31.

In Fig. 3 the driven shaft 35 has its head 37 splined at 38 to the shaft 39 which, as before, is supported at 40 substantially in the plane of the bearing 29.

In Fig. 3, however, the outer end of the shaft 39 has mounted thereon a sun gear or sun wheel 50 which meshes with planet gears 51 mounted on a spider or planet gear frame 52 which is carried by a shaft 53. The inner end of the shaft 53 is supported at 54 in the shaft 39 substantially in the plane of the bearing 29 and the outer end of the shaft 53 has formed thereon a flange or collar 55 coacting with a thrust bearing 56.

The planet gears 51 mesh with a ring gear 57 which is secured to the engine casing end wall 58.

In the form of construction illustrated in Fig. 4 the shafts 35, 39 and 53 are mounted and driven in the same manner as that illustrated in Fig. 3. In this form of the invention, however, the ring gear 57 is carried by a spider or disk 61 which is secured to the thrust collar 55 of the shaft 53. The sun gear or sun wheel 50 is mounted on the shaft 53 in the same manner as in Fig. 3. The planet gears 51 are carried by an annular bracket 62 which is fixedly secured to the end wall 58 of the engine casing.

In the form of the invention shown in Fig. 5, the main drive shaft is made up of a pair of hollow shafts 65 and 66 having on their inner ends flanges which extend peripherally therefrom, as shown at 67 and 68, the flanges being bolted to a centrally disposed slant 69. Slants 70 and 71 are secured to flanges 72 and 73 formed on the outer ends of shafts 65 and 66.

The shafts 65 and 66 are mounted in bearings 74, 75 and 76 and the shaft 66 has a peripheral flange 77 which is mounted in a thrust or locating bearing 78.

The main power take-off shaft 80 has formed on its inner end a flange or head 81 which is bolted to an inwardly extending flange 82 formed on the inner end of the shaft 66 and disposed in substantial alinement with the point of intersection of the slant 69 with the combination hollow shaft 65, 66.

The auxiliary power take-off shaft 83 has also formed on its inner end a corresponding inwardly extending flange 84 which is also bolted to the flange 82.

In this three slant arrangement the lowest speeds of vibration and those most likely to come within the range of engine speed will be associated with the two outer slants. These will tend to vibrate about the plane of the central slant and this point of drive take-off will have the least vibratory disturbance. These will, of course, be other nodal points for combinations of the three slants. The take-off point can be taken to suit the condition at which best average results may be obtained for any particular engine.

Although certain specific embodiments of the invention have been particularly shown and described, it will be understood that the invention is capable of modification and that changes in the construction and in the arrangement of the various cooperating parts may be made without departing from the spirit and scope of the invention, as expressed in the following claims.

What I claim is:

1. Crankless mechanism comprising a cylinder, a pair of oppositely acting pistons therein, a hollow shaft having a pair of slants mounted thereon of substantially equal mass, means connected to the pistons for transmitting the piston motions to the slants, a driven shaft and a connection between the driven shaft and slant shaft disposed within the slant shaft and substantially midway between the slants, said driven shaft being spaced from the wall of the hollow slant shaft except at the point of connection between said shafts.

2. Crankless mechanism comprising a cylinder, a pair of pistons in said cylinder, a shaft, a pair of slants mounted on said shaft and operatively connected to said pistons, a driven shaft, a connection between said driven shaft and said slant shaft at a point of minimum vibratory disturbance in said slant shaft, a third shaft, a bearing for the first shaft and a connection between said driven shaft and third shaft located adjacent to and in substantial registration with said bearing.

3. Crankless mechanism comprising a cylinder, a pair of pistons in said cylinder, a hollow shaft, a pair of slants mounted on said shaft and operatively connected to said pistons, a driven shaft, a connection between said driven shaft and said slant shaft, disposed within the hollow shaft and at a point of minimum vibratory disturbance in said slant shaft, a third shaft and a connection between the driven shaft and third shaft disposed within the slant shaft.

4. Crankless mechanism comprising a cylinder, a pair of pistons in said cylinder, a hollow shaft, a pair of slants mounted on said shaft and operatively connected to said pistons, a driven shaft, a connection between said driven shaft and said slant shaft, disposed within the hollow shaft and at a point of minimum vibratory disturbance in said slant shaft, a bearing for the first shaft and a connection between said driven shaft and third shaft located adjacent to and in substantial registration with said bearing.

5. Crankless mechanism comprising a shaft, three slants mounted thereon, the middle slant being disposed midway between the other two slants, and a power take-off shaft connected to said slant shaft substantially in the plane of the center slant.

6. Crankless mechanism comprising a hollow shaft, three slants mounted thereon, the middle slant being disposed midway between the other two slants, and a power take-off shaft connected to said slant shaft substantially in the plane of the center slant and disposed within said hollow shaft.

7. Crankless mechanism comprising a hollow shaft, three slants mounted thereon, the middle slant being disposed midway between the other two slants, and a power take-off shaft connected to said slant shaft substantially at a point having minimum vibratory disturbance and disposed within said hollow shaft.

8. Crankless mechanism comprising a hollow shaft, a pair of slants mounted thereon, a driven shaft connected to said first shaft at the nodal point between said slants, a bearing for the slant shaft, a third shaft supported in the slant shaft in substantial alinement with said bearing, and a bearing for supporting the outer end of said third shaft.

9. Crankless mechanism comprising a hollow shaft, a pair of slants mounted thereon, a driven shaft connected to said first shaft at the nodal point between said slants, a bearing for the slant shaft, a third shaft supported in the slant shaft in substantial alinement with said bearing, and a bearing for supporting the outer end of said third shaft, said third shaft being hollow.

10. Crankless mechanism comprising a hollow shaft, a pair of slants mounted thereon, a driven shaft connected to said first shaft at the nodal point between said slants, a bearing for the slant shaft, a third shaft supported in the slant shaft in substantial alinement with said bearing, and a bearing for supporting the outer end of said third shaft, a fourth shaft and a driving connection between the third and fourth shafts disposed adjacent the bearing at the outer end of the third shaft.

THOMAS L. SHERMAN.